United States Patent [19]
Ayanoglu et al.

[11] Patent Number: 5,528,625
[45] Date of Patent: Jun. 18, 1996

[54] HIGH SPEED QUANTIZATION-LEVEL-SAMPLING MODEM WITH EQUALIZATION ARRANGEMENT

[75] Inventors: Ender Ayanoglu, Red Bank; Glenn D. Golden, Tinton Falls; Raymond K. Jones, Voorhees; James E. Mazo, Fair Haven; David G. Shaw, Middletown, all of N.J.

[73] Assignee: AT&T Corp., Murray Hill, N.J.

[21] Appl. No.: 176,742

[22] Filed: Jan. 3, 1994

[51] Int. Cl.[6] ............................. H04L 5/16; H04L 27/02; H03K 7/02; H04B 1/38
[52] U.S. Cl. .................... 375/222; 375/268; 375/353; 375/219; 379/93
[58] Field of Search ................................ 375/259, 268, 375/300, 353, 240, 242, 245, 219, 222; 381/29; 379/93, 94, 97, 98, 99

[56] References Cited

U.S. PATENT DOCUMENTS

| 3,795,865 | 4/1974 | Armstrong | 325/42 |
|---|---|---|---|
| 4,037,160 | 7/1977 | Miloradovic et al. | 325/42 |
| 4,227,250 | 10/1980 | Wyner | 375/37 |
| 4,367,456 | 1/1983 | Munter | 340/347 |
| 5,115,450 | 5/1992 | Arcuri | 375/7 |

OTHER PUBLICATIONS

B. R. Peterson and D. D. Falconer, "Minimum Mean–Square Equalization in Cyclostationary and Stationary Interference–Analysis and Subscriber Line Calculations", IEEE JSAC, vol. SAC–9, No. 6, pp. 931–940.

Primary Examiner—Edward L. Coles, Sr.
Assistant Examiner—Allan A. Esposo

[57] ABSTRACT

The present invention is a quantization-level-sampling (QLS) modem which includes means for separately equalizing each loop of an end-to-end digital telephone system network connection by employing a plurality of transmitter filters and a plurality of receiver filters in such a way that, in the direction of transmission from modem to central office, the voltage samples seen by the coder/decoder stations are equivalent to the network quantization levels transmitted by the modem, and in the direction of transmission from central office to modem, the voltage samples seen by the modem are equivalent to the network quantization levels encoded by the coder/decoder stations. The invention also includes a QLS modem communications system which includes the aforesaid digital telephone system network and a plurality of QLS modems. In preferred embodiments, an adaptation service unit within the telephone system network assists in the determination of the settings of the transmitter and receiver filters.

14 Claims, 6 Drawing Sheets

HIGH SPEED QUANTIZATION-LEVEL-SAMPLING MODEM WITH EQUALIZATION ARRANGEMENT

BACKGROUND OF THE INVENTION

1. Field of the Invention

The present invention relates to data communications techniques which are used in voiceband telephone networks.

Voiceband telephone networks are often used as a transmission medium for data communication using modems. Most telephone networks in use today employ digital transmission. However, since the signals generated by conventional telephones and modems are analog rather than digital, conversion between the two formats is necessary, and is usually performed at telephone company central offices. Analog signals from the customer premises are transmitted to the central offices over wire pairs called 'loops'. At the central office, the analog loop signals are sampled and converted to a digital data stream—a sequence of digital words—for transmission through the network. Conversely, digital data streams arriving at the central office from the network are converted back into analog form for analog transmission over the loop to the appropriate customer.

Telephone systems throughout the world have adapted various standards for encoding the analog signals as digital data streams. Illustratively, the Public Switched Telephone Network (PSTN) in use throughout the U.S. utilizes an encoding scheme in which the analog line signal is bandlimited to approximately 3 kHz, then sampled every 125 microseconds (8000 samples per second) with each sample being mapped to one of 255 possible quantization levels according to a non-linear mapping rule called µ-law. The quantization level chosen for each sample is the one closest to the sample voltage, and this level is then represented as an 8-bit digital word. Thus, the analog line signal is represented as a 64 kilobit/second data stream composed of 8000 8-bit words per second. This conversion process, and the reverse process of converting the digital stream back to analog form, is performed at the central office by a device known as a coder/decoder, or CODEC.

The analog-to-digital conversion process performed by the CODEC inherently introduces distortion into the signal. This distortion, called quantization distortion, is due to the mapping of the analog voltage sample into the nearest quantization level. The µ-law rule was designed to permit voice signals, which have a dynamic range of considerably more than 8 bits, to be encoded into 8-bit samples while maintaining a level of quantization distortion which is not perceptually objectionable.

In addition to voice, telephone system customers may also utilize the network to transmit and receive digital data using modems. A modem performs the task of converting the customer's digital data sequence into a bandlimited analog signal which can be transmitted through the telephone network as though it were a voice signal. A modem at the destination customer premises receives the analog modem signal and converts it back into the transmitted digital sequence. A key point here is that known conventional modems, in effect, treat the telephone network as though it were a pure analog channel, i.e. they do not explicitly take into account the effects of analog-to-digital and digital-to-analog conversion within the telephone network, and so the analog signals generated by such modems suffer the same quantization distortion effects as do ordinary voice signals. This distortion, called quantization noise, though not large, nevertheless represents a significant impairment as modem transmission speeds are increased. Primarily due to the limiting effects of quantization noise, present art conventional modems operate at a maximum channel data rate of around 20 kilobits/second (kbps).

A central concept of the present inventive modem is that the effects of quantization distortion can be avoided by using pulse amplitude modulation (PAM) in which the amplitude levels are chosen to be the quantization levels used by the telephone network. The user's data is encoded into this quantization-level channel symbol alphabet, and thus explicitly transported across the network in digital form. We refer to a modem utilizing this principle as a 'quantization level sampling' (QLS) modem.

2. Information Disclosure Statement

One of the impediments to the realization of a QLS modem has been the lack of an appropriate framework, both theoretical and practical, for attacking the significant equalization problems involved, since the methods used in conventional modems are not directly applicable to the QLS equalization problem. However, we have realized that aspects of the theory of equalization in multi-user communication systems, such as described in B. R. Petersen and D. D. Falconer, "*Minimum Mean-Square Equalization in Cyclostationary and Stationary Interference—Analysis and Subscriber Line Calculations*", IEEE JSAC, Vol. SAC-9, No. 6, pp. 931–940, can be applied in a heretofore unrealized manner to the QLS equalization problem. Thus, while multi-user data communications systems do show the underlying theory of one aspect of the present inventive modems, there has not heretofore been any use or application of that technology to single user modems as in the present invention.

SUMMARY OF THE INVENTION

The present invention is a quantization-level-sampling (QLS) modem which includes means for separately equalizing each loop of an end-to-end digital telephone system network connection by employing a plurality of transmitter filters and a plurality of receiver filters in such a way that, in the direction of transmission from modem to central office, the voltage samples seen by the CODEC are equivalent to the network quantization levels transmitted by the modem, and in the direction of transmission from central office to modem, the voltage samples seen by the modem are equivalent to the network quantization levels encoded by the CODEC. The invention also includes a QLS modem communications system which includes the aforesaid digital telephone system network and a plurality of QLS modems. In preferred embodiments, an adaptation service unit within the telephone system network assists in the determination of the settings of the transmitter and receiver filters.

BRIEF DESCRIPTION OF THE DRAWINGS

The present invention is more fully understood when the specification is taken in conjunction with the drawings appended hereto, wherein.

DETAILED DESCRIPTION OF THE PRESENT INVENTION

As mentioned above, the present invention involves a high speed modem which includes means for separately equalizing each loop of an end-to-end digital telephone system network connection by employing a plurality of transmitter filters and a plurality of receiver filters in such a way that, in the direction of transmission from modem to central office, the voltage samples seen by the coder/decoder stations are equivalent to the network quantization levels transmitted by the modem, and in the direction of transmission from central office to modem, the voltage samples seen by the modem are equivalent to the network quantization levels encoded by the coder/decoder stations. Thus, the present inventive quantization-level-sampling modem or QLS modem may be utilized with any digital telephone system network whether it be a linear or non-linear quantizing-rule-based telephone system network. Such telephone system networks include, but are not limited to, μ-law networks currently in use, and μ-law modems described herein are preferred examples of the present inventive high speed QLS modems.

Figure 1:
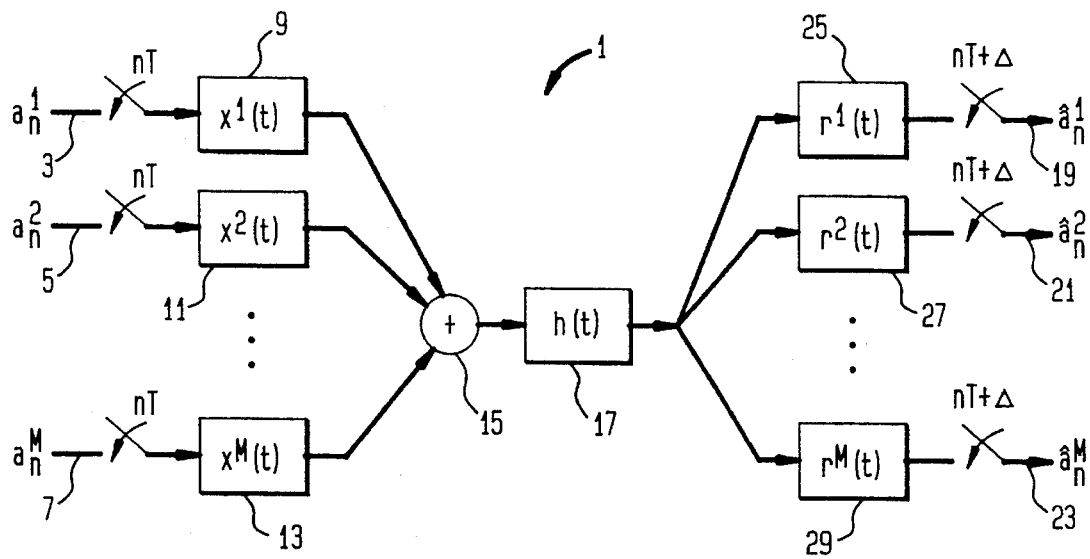
FIG. 1 shows a schematic diagram of a prior art multi-user communication system.

FIG. 1 shows a theoretical model 1 of a multi-user data communication system in which M users transmit symbol sequences $\{a_n^1\}$, $\{a_n^2\}$, ... $\{a_n^M\}$, such as symbol sequences 3, 5 and 7, each at rate 1/T symbols per second, using transmit filters $x^1(t), x^2(t), \ldots, x^M(t)$ shown as transmitter filters 9, 11 and 13. It is assumed that the symbols from each user arrive at the inputs to their respective transmit filters at times nT. The output of all the transmit filters is summed in a transmitter summer 15, and the resultant signal is transmitted over h(t), linear time-invariant channel 17 Estimates $\{â_n^1\}$, $\{â_n^2\}$, ..., $\{â_n^M\}$, represented by outputs 19, 21 and 23, of the original transmitted sequences are formed by passing the channel output signal through M parallel receive filters such as filters 25, 27 and 29, $r^1(t), \ldots, r^M(t)$, and sampling the receiver output signals at times nT+Δ, where Δ is the system group delay.

Systems of this type have been studied in the open literature. See, for example, B. R. Petersen and D. D. Falconer, *"Minimum Mean-Square Equalization in Cyclostationary and Stationary Interference—Analysis and Subscriber-Line Calculations"*, IEEE JSAC, Vol. SAC-9, No. 6, pp. 931–940, August. 1991. It has been shown that if h(t) has two-sided spectral support of at least M/T Hz, then it is possible to specify transmitter and receiver filters such that each of the M data streams can be recovered without interference from the others. A set of transmitter and receiver filters realizing this state of affairs may be referred to as meeting the generalized zero-forcing (GZF) criterion. A key point is that satisfaction of the GZF criterion requires that both transmitter and receiver filters satisfy certain spectral requirements. In general, if the transmitter filters are arbitrarily chosen, then the existence of receiver filters which realize the GZF condition is not guaranteed. Similarly, if the receiver filters are arbitrarily chosen, then there is no guarantee that there exist transmitter filters which can realize the GZF condition.

An extension of this analysis shows that the GZF criterion can still be met if either the set of the transmitter filters or the set of receiver filters is fixed, and one has the flexibility to choose the other set, provided that the fixed set satisfies certain spectral requirements. In particular, if the members of the fixed filter set are purely delay elements and if no two of the delay values are identical, then these spectral requirements are nearly always satisfied, and it is possible to choose the other set of filters so as to realize the GZF criterion.

Thus, for example, if $$x^j(t) = \delta(t-\theta_j) \; j=1,2,\ldots,M \qquad (1)$$

where δ(.) is the Kronecker delta and the $\theta_j$ are distinct, then it is nearly always possible to determine receivers $r^1(t), r^2(t), \ldots, r^M(t)$ which satisfy the GZF criterion. Similarly, if the receivers are fixed delays, i.e.

$$r^j(t) = \delta(t-\theta_j) \; j=1,2,\ldots,M \qquad (2)$$

then it is possible to determine $x^1(t), x^2(t), \ldots, x^2(t)$ so that the GZF criterion is satisfied.

The notion of receive filters or transmit filters which are pure delays has interesting and important consequences which allow the multi-user system of FIG. 1 to be reinterpreted as a single-user system in which the lone user transmits just one symbol stream, but with nonuniform time spacing between symbols. This latter interpretation is directly applicable to the μ-law modem problem, which is reviewed below.

The μ-law modem Problem—Background

Figure 2:
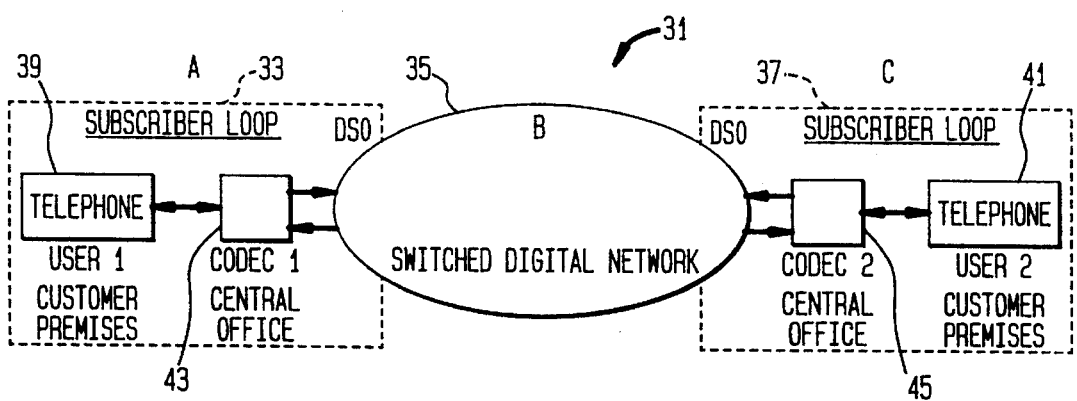
FIG. 2 shows a schematic diagram of basic components of a prior art end-to-end conventional telephone system ("POTS"—Plain Old Telephone Service)

FIG. 2 shows the three tandemed components 33, 35 and 37 of an end-user to end-user "POTS" (Plain Old Telephone Service) telephone connection 31. Sections A and C of the POTS connection are the subscriber loops 33 and 37 which carry the analog signals from the users' telephone sets 39 and 41 to their associated local central offices 43 and 45. At the central offices, the analog signals are converted to 64 kbps digital data streams, known as DS0, which are transported to their respective destination central offices via digital transmission facility 35. At the destination end, the digital data streams are converted back to analog signals which are driven out to the appropriate destination stop.

To expand further on the details of the analog to digital conversion process, consider only one direction of transmission, say from User 1 to User 2. At the central office 43, User 1's loop signal is converted to digital form by first sampling the analog signal at a rate of 8 ksamples/second, then converting these samples to an 8-bit digital representation of the analog samples using a non-linear quantizing rule known as μ-law. The μ-law rule was designed to permit voice signals, which have a dynamic range considerably greater than 8 bits, to be encoded into 8-bit samples while maintaining a level of distortion that is not perceptually objectionable. (The distortion is due to the mapping of the analog voltage samples into the nearest one of the 255 possible quantization levels.) At User 2's central office 45, the incoming DS0 stream from User 1 is converted back to analog form by reversing the µ-law quantization mapping rule, and converting the resultant de-quantized samples back to analog form. The quantization and de-quantization operations are performed by a device known as a CODEC (coder/decoder) at the central office.

In addition to voice, telephone customers may also use modems to transmit digital data over the POTS network. In a conventional modem, the user's digital data sequence is represented as a bandlimited analog symbol which can be transmitted over the approximately 3 kHz bandwidth available on POTS loop. A matching modem at the far end receives the analog signal and converts it back into the transmitted digital sequence. A key point here is that conventional modems do not explicitly take into account the analog-to-digital conversion and µ-law encoding processes inherent in the public telephone transmission systems, so the analog signals generated by such modems suffer exactly the same quantization distortion effects as do voice signals. This distortion appears in the received analog signal as an additive noise-like interference, referred to as quantization noise. Although the quantization noise is small, it nevertheless represents a limiting impairment as modem transmission speeds are increased. (The theoretical limit is generally considered to be in the vicinity of 32 kbps, but it depends on the specific connection. As a practical matter, presently available conventional modems operate at a maximum channel data rate of around 20 kbps.)

The central idea of a present inventive high speed µ-law modem is to avoid the effects of quantization distortion by equalizing each leg of the end-to-end POTS connection separately, and utilizing the µ-law quantization levels themselves as the channel symbol alphabet. The modem then signals using this alphabet so that, assuming accurate equalization, the analog samples seen by the transmit-leg CODEC will be just the transmitted symbols themselves, i.e. the sequence of µ-law quantization levels. Thus, the transmitted symbol sequence is explicitly transported across the network in digital form. Similarly, at the receive leg, the digital sequence driving the CODEC decoder is again the original transmitted symbol sequence. With appropriate equalization of the receive-leg loop at the receiver as set forth herein, this symbol sequence can be recovered and remapped back into the original user data.

In order to illustrate this, refer to FIG. 2, and again consider only the User 1 to User 2 direction of transmission. Consider first an idealized version of the POTS connection in which the loops have $\geq 4$ kHz of bandwidth available and are thus capable of supporting PAM (Pulse Amplitude Modulation) signaling at a symbol rate equal to the CODEC sampling rate of 8000 symbols/second. Assume further that the transmit-leg loop has been appropriately equalized at the transmitter end so that the analog voltage samples seen by CODEC 1 are just the symbols transmitted by User 1. Choose as our PAM symbol alphabet the µ-law quantization levels, so that we have a 255-point one-dimensional signal constellation onto which we can map the user's data, approximately 8 bits per symbol. Under these assumptions, each voltage sample seen by CODEC 1 would correspond exactly to a µ-law quantization level transmitted by User 1, and hence would be represented as the corresponding 8-bit digital value for transmission over the digital facility. Assuming that no errors are introduced by the transmission facility, the same voltage sample sequence would be produced at the output of CODEC 2, which drives the receive leg. Once again, assuming that the receive-leg loop is appropriately equalized, the receiver can sample at 8 kHz and recover the transmitted quantization level symbol sequence, which can then be mapped back into the original transmitted user data. Under these idealizing assumptions then, we can, in principle, achieve nearly the full DS0 transport rate of 64 kbps.

In practice there are several considerations which complicate the situation. First among these is that the loops are bandlimited. The bandlimiting is due to bandpass filters in the CODECs which restrict the usable frequency response to a range of approximately 300 Hz to 3.3 kHz. From basic Nyquist theory, it is known that a channel with two-sided bandwidth of W Hz is capable of supporting low-distortion signaling at a rate no greater than W symbols/second. Thus, with the approximately 6 kHz of available two-sided loop bandwidth, the maximum symbol rate is reduced to around 6 ksymbols/second, and so transmission at a rate of approximately 48 kbps is still feasible even when the practical bandwidth consideration is taken into account. This is a significant improvement over present art conventional voiceband modem capabilities.

Another significant practical problem is that conventional equalization techniques cannot be directly applied to the y-law problem. Conventional modems treat the tandemed loops and network as a composite channel, which requires only end-to-end equalization. For the µ-law modem, there are two independent channels to equalize. Furthermore, the µ-law modem must utilize a particular symbol set, and conform to the sampling characteristics imposed by the network. In order to achieve efficient utilization of the loop bandwidth, these network-imposed sampling characteristics require delivering data symbols to and receiving data symbols from the CODECs at symbol sampling times which are not necessarily uniformly spaced. Conventional equalization arrangements, which utilize only a single equalizer, are inadequate to accommodate these specialized sampling requirements. Thus, despite superficial similarities, it is not obvious how to go about adapting conventional techniques to the µ-law equalization problem. The present invention is directed to a new high speed modem based on the application of the abovementioned multi-user equalization techniques to the µ-law problem in a heretofore unrealized manner.

Application of the Multi-User System to the µ-law problem

Figure 3A:
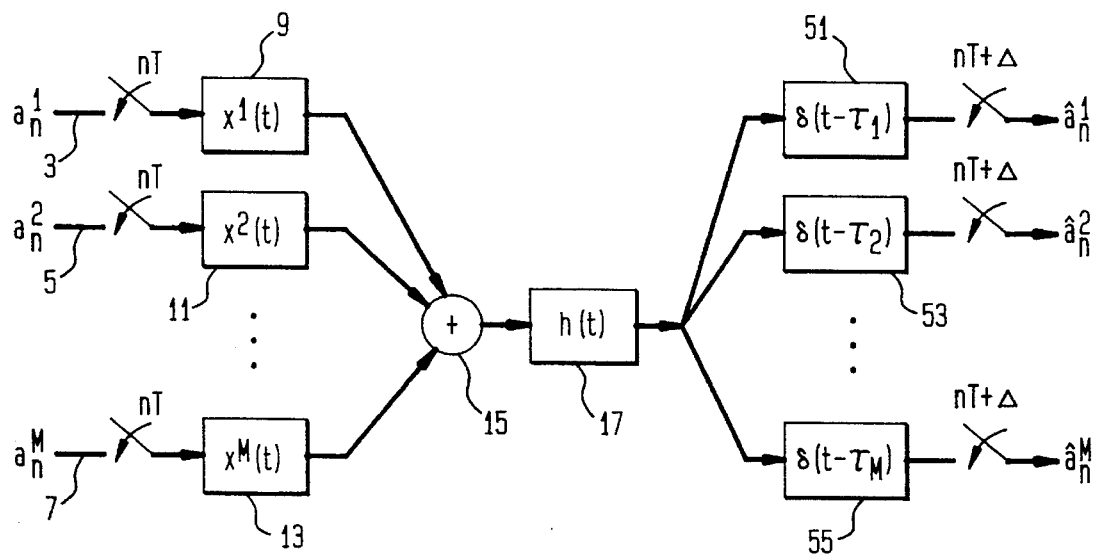
FIGS. 3a and 3b show schematic diagrams of multi-user systems with pure delay receivers interpreted as the transmit leg of a QLS modem upon which the present inventive QLS modem is developed.
Figure 3B:
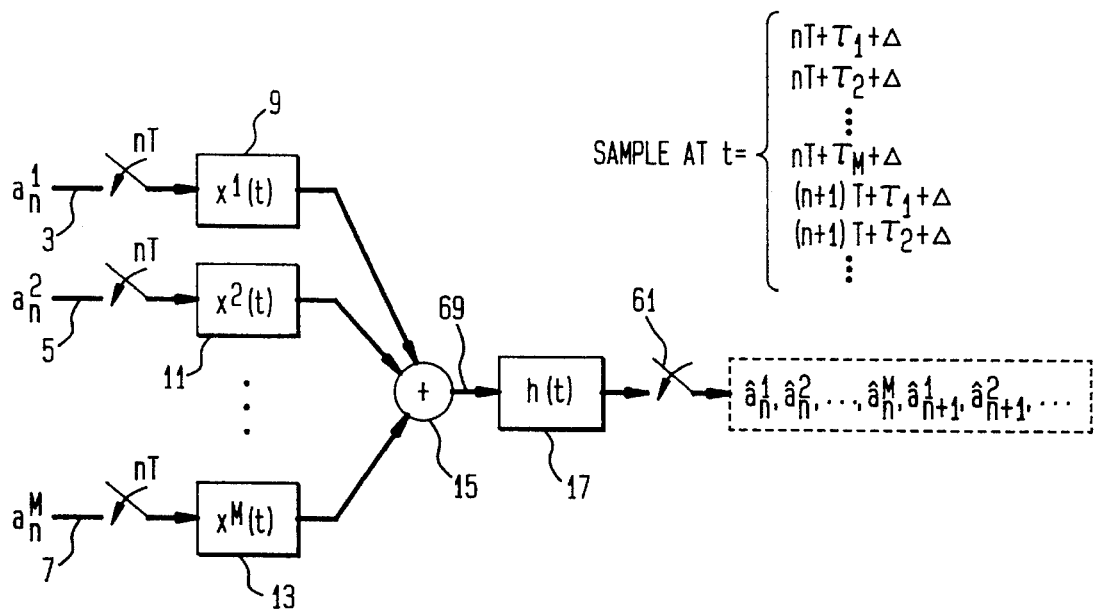

Consider the multi-user system of FIG. 1 in which the receivers are pure delays and the transmitters have been determined so as to realize the GZF criterion. In this case, the multiple-branch receiver can be simplified as shown in FIGS. 3a and 3b, wherein the transmit symbol sequences 3, 5 and 7; the transmitter filters 9, 11 and 13; the transmitter summer 15 and the linear time-invariant channel 17 are the same in both figures here as in FIG. 1 and are identically numbered. Here, the multiple pure-delay receiver filters 51, 53 and 55 (FIG. 3a) reduce to sampler 61 which samples the channel output at times $nT+\theta_j+\Delta$ (FIG. 3b). This is the interpretation applicable to the transmit leg of the µ-law modem. In this interpretation of the GZF multi-user system, the M symbol sequences are considered to be due not to M independent users each transmitting at rate 1/T symbols/second, but to a single user who transmits one rate-M/T symbol sequence. The lone user utilizes the M GZF transmitter filters for this task by grouping his rate-M/T symbol sequence into M rate-1/T symbol sequences, driving each of these to its own transmitter filter, and summing the output of all M filters to form his transmitted signal 69. As long as the available two-sided channel bandwidth is at least M/T Hz and the $\theta_j$ are all distinct, it is nearly always possible, recalling earlier observations above, to design GZF transmitter filters (effectively transmit equalizers) so that the channel output at time $nT+\theta_j+\Delta$ is just the n-th transmitted symbol from the j-th transmitter.

This interpretation is mapped onto the μ-law transmit leg problem as follows: The 'receiver' of the transmit leg of the μ-law modem is just the CODEC, which samples uniformly at 8 ksamples/second. Assume that the transmit leg has a two-sided bandwidth of at least 6 kHz, and transmit a sequence of symbols (quantization levels) at rate 6 ksymbols/second over this bandwidth in such a way that out of every 8 samples at the receive side of the transmit leg, 6 of these are the transmitted quantization levels. (It is known a priori from Nyquist theory that with the 6 kHz of available two-sided bandwidth, at most 6 out of every 8 samples can be arbitrarily chosen.) This can be accomplished using a GZF transmitter array with M=6, 1/T=1 kHz, and a pure-delay receiver array (i.e. a sampler) which samples at times $nT+\theta_j+\Delta$, with, e.g.

$$\theta_j = \frac{(j-1)T}{8}, j = 1, 2, \ldots, 6.$$

(Note: It is preferable that the values of j be sequential, but it is believed that the values of j may be non-sequential and yet still within the scope of the present invention.) Thus, with this arrangement, 6 out of every 8 of the 125 μs channel output samples are driven to the transmitted quantization level, the desired result. (The disposition of the other two samples is important, and these are discussed below.)

Figure 4A:
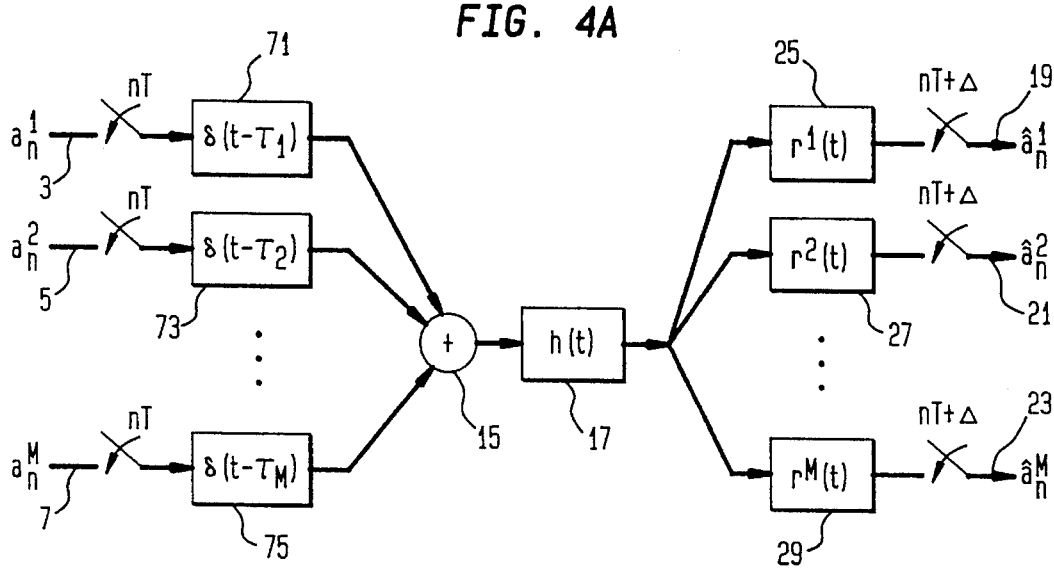
FIGS. 4a, 4b and 4c show schematic diagrams of multi-user systems with pure delay transmitters interpreted as the receive leg of a QLS modem upon which the present inventive QLS modem is developed.
Figure 4B:
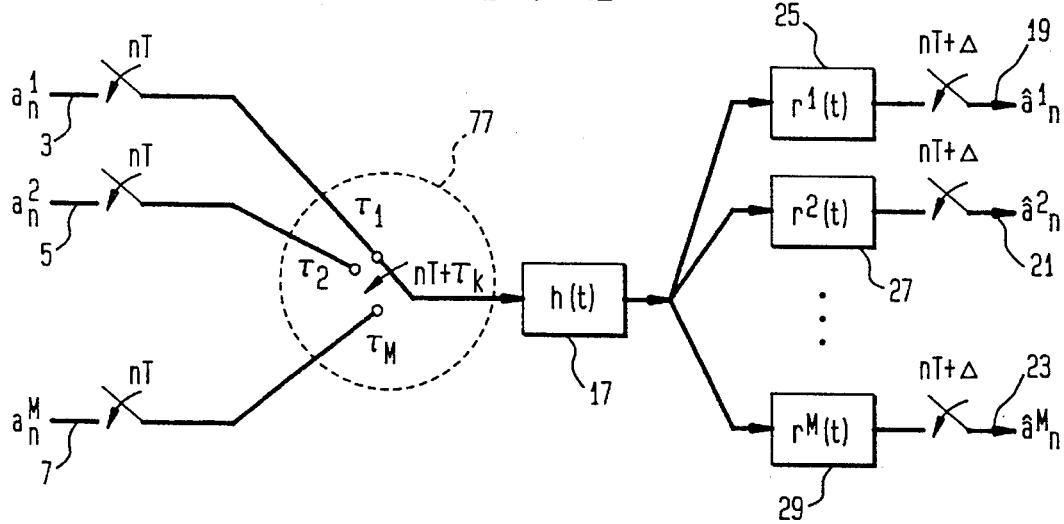
Figure 4C:
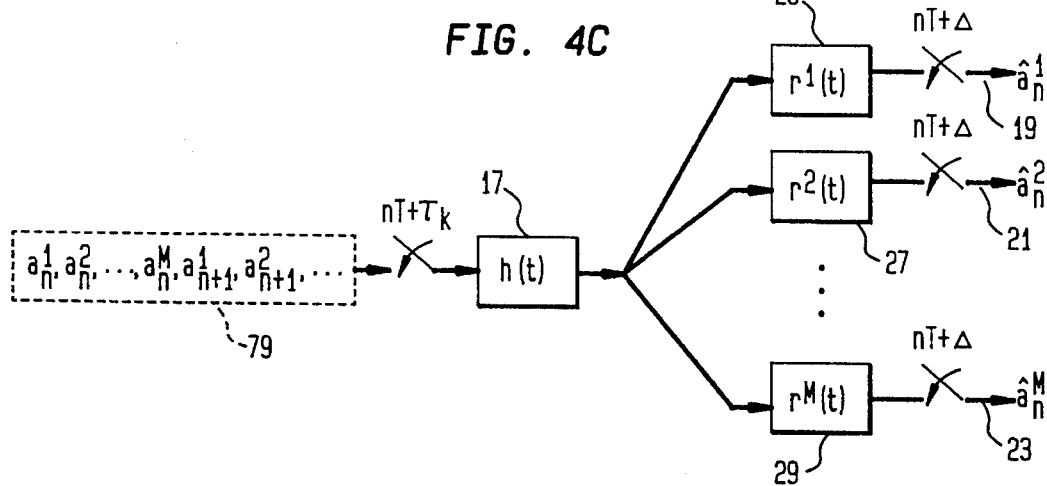

With reference to FIGS. 4a, 4b and 4c and 5a and 5b, elements discussed above and repeated in these figures are identically numbered. Note that similar to above, when the $x^j(t)$ are purely delay elements, then the multiple-branch transmitter with filters 71, 73 and 75 (FIG. 4a) can be reinterpreted as in FIG. 4b, as a commutator 77 sampling each of the transmitted symbol streams in turn, with delays $\theta_j$ between adjacent commutator positions. A further interpretation of commutator 77 is that of a single rate-M/T transmitted symbol stream 79 driving the channel 17, with fixed delays $\theta_j$ between successive symbols (FIG. 4c). This is the interpretation applicable to the receive leg of the μ-law modem: The receive-leg CODEC decodes the μ-law-encoded digital sample stream into a sequence of analog quantization levels which is driven out to the receive loop at a rate of 8 ksamples/second. In accordance with the above discussion of the transmit leg, 6 out every 8 of these samples are just the quantization levels (i.e., the symbols) transmitted by the far-end user. This single symbol stream can be interpreted, by the arrangement of FIG. 4c, as an M-user GZF system with pure-delay transmitter filters, again with M=6, 1/T=1 kHz, and sampling times $$nT + \theta_j, \theta_j = \frac{(j-1)T}{8}, j = 1, 2, \ldots, 6.$$

If the receive leg loop has at least 6 kHz of two-sided bandwidth, then it is possible to design a set of 6 filters $r^1(t)$, ..., $r^6(t)$ (i.e. receive equalizers) which meet the GZF criteria. The outputs of these 6 equalizers are computed at the multi-user symbol rate, i.e. every 1 ms, and the output of the j-th equalizer at time $nT+\Delta$ is the quantization level which was transmitted by the receive-leg CODEC at time $nT+\theta_j$.

Attention is now directed to the disposition of the samples which do not bear user data. The following discussion continues to refer to the N=8, M=6 example above, in which the available two-sided bandwidth is 6 kHz, the CODEC sampling rate is 8 kHz, and the non-user-data-bearing samples are those which arrive at the CODEC at times $nT+\theta_7$ and $nT+\theta_8$. In general these samples cannot be used to transport arbitrary data, as this would violate the Nyquist limitation of 6 ksymbols/s for the 6 kHz of available bandwidth. Attempting to use the 7th and 8th samples would result in the introduction of intersymbol interference which could not be mitigated by the equalizers. However, it turns out that these samples can be put to use for the purpose of synchronizing the receive leg modem sampling clock with the network sampling clock, as will now be described.

Consider first the disposition of the non-user-data-bearing (NUDB) samples on the transmit leg. At the transmit leg CODEC, the values of the 7th and 8th samples are a function of prior and subsequent information-bearing symbols and of the impulse responses of the transmitter filters. In general, these NUDB samples will not be exact quantization levels, and so will end up being transported across the network as the quantization levels nearest to the actual NUDB sample values. At the receive leg, if these samples are left as-is, then the receive leg system becomes equivalent, in the multi-user interpretation, to eight, rather than six, parallel 1 ksymbol/s data streams. This would violate the Nyquist symbol rate limitation and intersymbol interference would result, i.e. the receive leg equalizers would not be able to realize the GZF criterion because they could not eliminate the interference from the two "extra" data streams.

One simple way to avoid this problem is to force the NUDB samples to zero at the receive leg CODEC. In effect, this eliminates the two "extra" data streams, so that the Nyquist symbol rate limitation is avoided and the receive leg equalizers can realize the GZF criterion. However, it is not necessary to force the NUDB samples to zero in order to allow the receive equalizers to realize the GZF criterion. It turns out that certain deterministic patterns of symbols (i.e. quantization levels) can be transmitted using the NUDB samples on the receive leg without inducing interference that cannot be mitigated by the receive equalizers. One particular such pattern is the alternating sequence $\{x_7, x_8, \ldots -x_7, -x_8\}$, where $x_7$ and $x_8$ denote two of the possible quantization levels. The deterministic nature of this pattern, and others having similar properties, can be used advantageously at the μ-law modem receiver to assist in the determination of the network sampling rate.

Adaptive Determination of the Equalizers for the Present Inventive μ-Law Modem

Since the transfer characteristics of the loops vary from connection to connection, as well as with time, the equalizer settings for QLS modems must be adaptively determined. Some of the necessary adaptation-related tasks are performed by an adaptation service unit (ASU), separate from the modems. An ASU is, illustratively, a program or signal processing apparatus embedded within the telephone system network which is capable of observing and communicating information from within the network to network-attached QLS modems prior to equalization.

Among other capabilities, an ASU can observe the digital sample sequence from a network CODEC and communicate this sequence to an attached QLS modem. An ASU can also derive a digital filter based on the difference between an observed CODEC sample sequence and a known sequence, and can communicate the coefficients of such a filter to an attached QLS modem. These two capabilities may be used for the purposes of determining the settings of the transmitter filters (transmitter equalizers) of a QLS modem. An ASU can also feed or "stuff" known digital sample sequences into network CODECs. This capability may be used for the purpose of determining the settings of the receiver filters (receive equalizers) of a QLS modem. In the following discussion of adaptation procedures, these ASU capabilities will be assumed to be available.

In the previous discussion, the only restriction on the sampling times $\theta_j$ was that they be distinct, but were otherwise arbitrary. In order to simplify the following description, uniformly-spaced sampling in FIGS. 3b and 4c is assumed by introducing integers N and M so that for the single-user problem, the CODECs sample uniformly at both transmitter and receiver at N/T Hz, the available two-sided bandwidth is M/T Hz, $M \leq N$, and it is desirable to signal end-to-end at a symbol rate of M/T symbols/second. This uniform sampling restriction is preferred in the solution to the μ-law problem, because the present inventive modems must conform to the sampling characteristics of the existing digital transport facilities that make up the network at large. For the μ-law modem, it is preferred to choose T=1 ms, N=8 and M=6. Thus, it becomes one objective of the invention to pre-equalize the transmit leg in such a way that six out of every eight of the 8 kHz samples seen by a CODEC (and transported digitally to another CODEC) correspond to symbols transmitted by User 1. Similarly, it becomes another object of the invention to post-equalize the receive leg so that at the receiver, where samples are taken uniformly at 8 kHz, six out of every eight samples again correspond to the transmitted symbols. However, in order to keep the following discussion general and be applicable to other possible but not currently commercial telephone network switching systems, N, M and T will be used rather than the specific numbers used for the above-stated μ-law problem based on T=1 ms, N=8, and M=6, one currently applicable commercial embodiment.

Figure 5A:
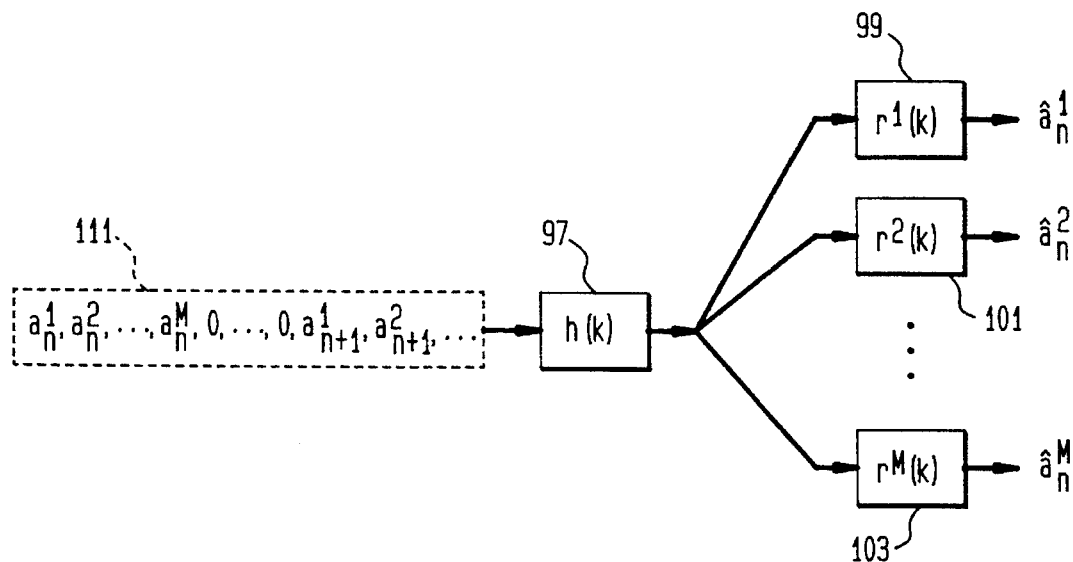
FIGS. 5a and 5b show schematic diagrams of discrete-time equivalents of a receive leg and a transmit leg of a QLS modem, respectively, which are the basis of the present invention QLS modem.
Figure 5B:
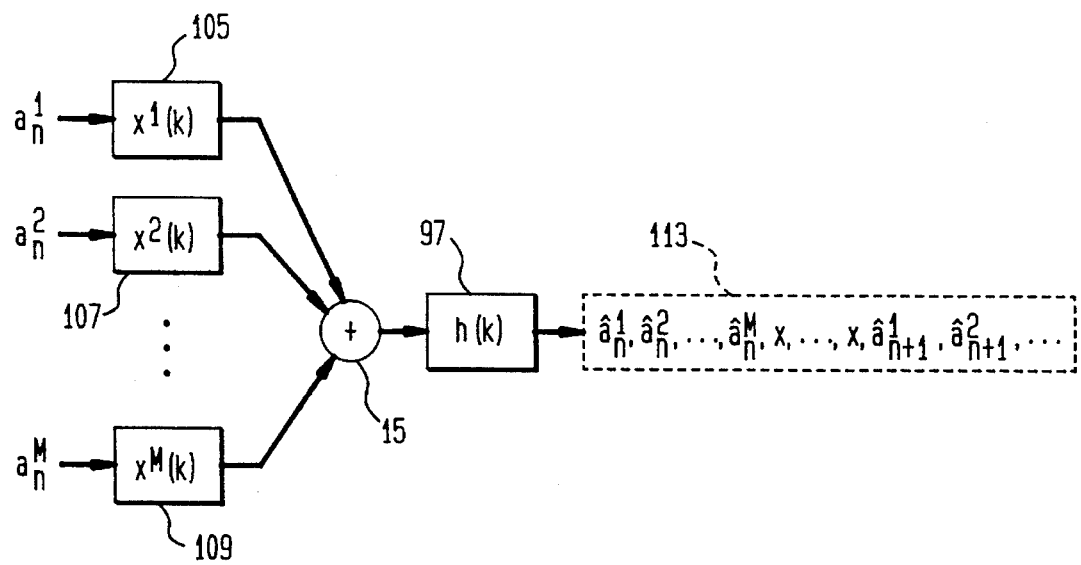

A discrete-time equivalent of the receive leg for the uniformly-sampled system is shown in FIG. 5a, and similarly for the transmit leg in FIG. 5b. The adaptation procedure for the two sets of equalizers 99, 101 and 103 $\{r^i(k), 1 \leq i \leq M\}$ and equalizers 105, 107 and 109, $\{x^i(k), 1 \leq i \leq M\}$ is similar.

First, consider the receive leg equalization diagram of FIG. 5a. In this configuration, composite impulse response h(k) 97 represents the combination of the channel bank receive side filter, the subscriber loop impulse response, and the modem front-end impulse response. It is assumed that the receiver has been synchronized with the network timing, i.e. the sampling rate at the receiver is identical to the network sampling rate, though with arbitrary phase difference. The goal is to adaptively determine the $r^i(k)$, $1 \leq i \leq M$ so that the sequence $\{a^i_n\}$ is recovered at the output of $r^i(k)$. This adaptation can be accomplished by transmitting a known digital sequence from the adaptation service unit towards the receiver, and using standard equalization methods, e.g. the LMS algorithm. The key is that each receiver $r^i(k)$ can be independently adapted, each meets the GZF criterion (i.e., $r^i$ equalizes the composite channel corresponding to its remote peer $x^i$, and simultaneously suppresses the interference from the non-peer transmitters $x^j$, $j \neq i$), and Nyquist theory guarantees that it exists.

Training using the LMS algorithm can be accomplished by driving the receive-leg CODEC with a known reference pseudo-random μ-law symbol sequence 111 of the form $$a^1_1, a^2_1, a^3_1, \ldots, a^M_1, 0 \ldots 0, a^1_2, a^2_2, a^3_2, a^M_2, 0 \ldots 0, \ldots \quad (3)$$

Note that each N-sample 'epoch' of the pseudo-random symbol sequence 111 consists of M non-zero samples $a^i_n$, $1 \leq i \leq M$, followed by N–M zeros. The receiver outputs are computed once per symbol period (i.e. one per every N input samples) and then the coefficients are adapted in the usual LMS sense, based on the difference between these symbol-spaced outputs and the corresponding symbols taken in turn from the above known reference sequence. (Thus, the i-th receiver uses as reference only the $a^i_n$ from the above sequence.) Using this approach, each of the $r^i(k)$ can be adapted independently of the others, or, if desired, the adaptation can be carried out for all $r^i(k)$ at once. Also note that although it is assumed that the adaptation service unit supplies the known reference sequence to the receive-leg CODEC, this sequence could in principle be provided by the User 1 transmitter, if the equalization of the transmit leg were accomplished first.

The transmitter configuration for the present inventive μ-law modem is shown in FIG. 5b. The adaptation procedure here is similar to that for the receiver, but there are some important differences. First, the channel response is estimated by the adaptation service unit by driving the channel with known samples and constructing a channel estimate, h(k), that minimizes the difference between the quantized values of the output samples 113 of h(k) and the output samples of the channel. The LMS algorithm can again be used for this purpose. The h(k) so derived is then used in computations made by the adaptation service unit, to determine the $x^i(k)$.

Figure 6A:
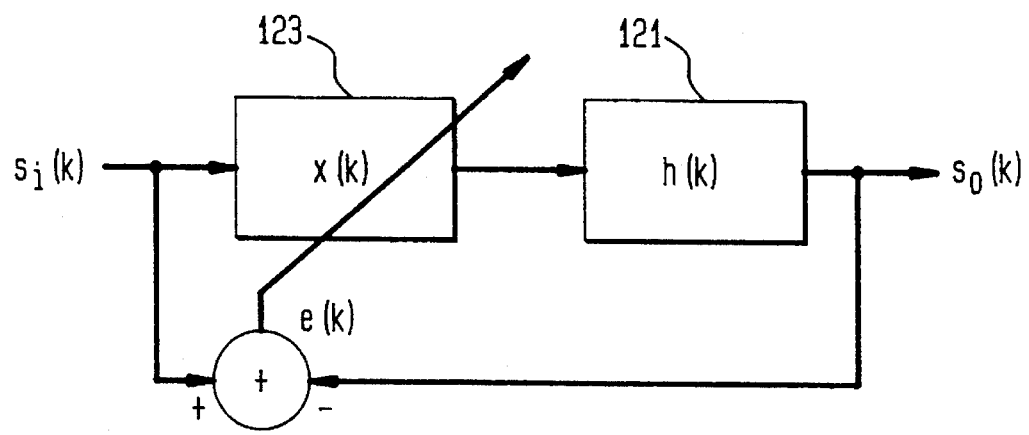
FIGS. 6a and 6b illustrate schematic diagrams of alternative configurations for transmitter adaptation for present inventive QLS modems; and, FIG. 7 illustrates a transmitter and receiver configuration for a present inventive QLS modem communications system arrangement.

Another difference is that the transmitter configuration of FIG. 5b, depicted in adaptive form in FIG. 6a, cannot be used efficiently for adaptively determining the $\{x^i(k)\}$. The reason for this is that in the configuration of FIG. 6a the channel 121 follows the equalizer 123, and so the adaptive updates made to the x(k) affect the error signal e(k) a long time after they are made, due to the group delay of h(k). This long delay implies the need for a small adaptation stepsize, hence convergence is slow. This convergence time problem can be avoided by using a post-channel equalizer configuration (FIG. 6b) having channel 125 and equalizer 127 during adaptation, determining the equalizer settings in that configuration, and then "moving" the equalizers back to their original position prior to the channel, as in FIG. 6a. The advantage of the FIG. 6b configuration for adaptation is that the effect of an update to the x(k) at time k is seen immediately at time k+1, and hence a large adaptation stepsize can be used and convergence is much faster.

Figure 6B:
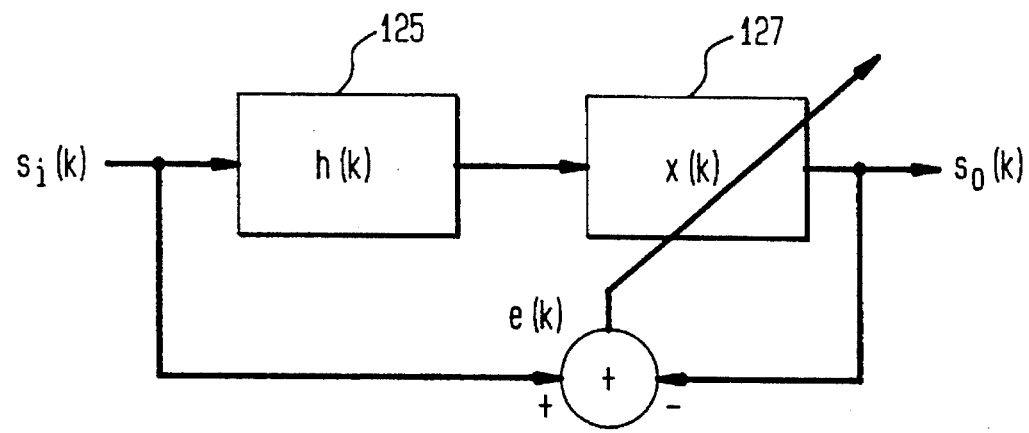

In the μ-law problem, a configuration like FIG. 6b, is thus preferred over that of FIG. 6a, and is suitable for transmitter adaptation purposes. It can be realized by simply driving the channel 97 in FIG. 5b directly with an input consisting of the pseudo-random sequence $$a^1_1, a^2_1, a^3_1, \ldots, a^M_1, 0 \ldots 0, a^1_2, a^2_2, a^3_2, \ldots a^M_2, 0 \ldots 0, \ldots \quad (4)$$

(Since this sequence is not driven through any pulse-shaping network, it is, in effect, wideband. In practice, a bandlimiting filter can be placed at the summing point of the transmitter outputs in order to bring the spectrum of the transmitted energy into conformance with FCC government requirements. However, this filter should be as wideband as possible, i.e. it should just meet, but not significantly exceed, the FCC transmitted power mask requirements.) Then, inside the adaptation service units, the relocated transmitter filters can be designed based on the above known sequence. Here, however, in contrast to the adaptation of the receivers, the coefficients of the $x^i(k)$ should be adapted on a sample rather than a symbol basis, because the impulse response must be forced to zero at all sampling times which are used by other transmitters. For example, transmitter filter $x^i(k)$ would be adapted based on the difference between its T/N-sampled output and the desired sequence $$a^1{}_1, 0, 0, 0, \ldots, x, a^1{}_2, 0, 0, 0, \ldots x, x, \ldots \qquad (5)$$

where the xs denote samples for which the transmitter filter is not adaptively updated. Similarly, the desired response for $x^2$ (k) is $$0, a^2{}_1, 0, 0, \ldots, x, x, 0, a^2{}_2, 0, 0, \ldots, x, \ldots, x, \ldots \qquad (6)$$

and for $x^3(k)$, $$0, 0, a^3{}_1, 0, \ldots, x, 0, 0, a^3{}_2, 0, \ldots, x, \ldots, x, \ldots \qquad (7)$$

and so on. Finally, once the transmit equalizers are designed in this way within the adaptation service units, the post-channel equalizer configuration (FIG. 6b) is transformed into the pre-channel equalizer configuration (FIG. 6a/5b) by transmitting the equalizer coefficients to the modem at the customer premises. This pre-channel equalizer configuration is a desirable, alternative present inventive embodiment.

Figure 7:
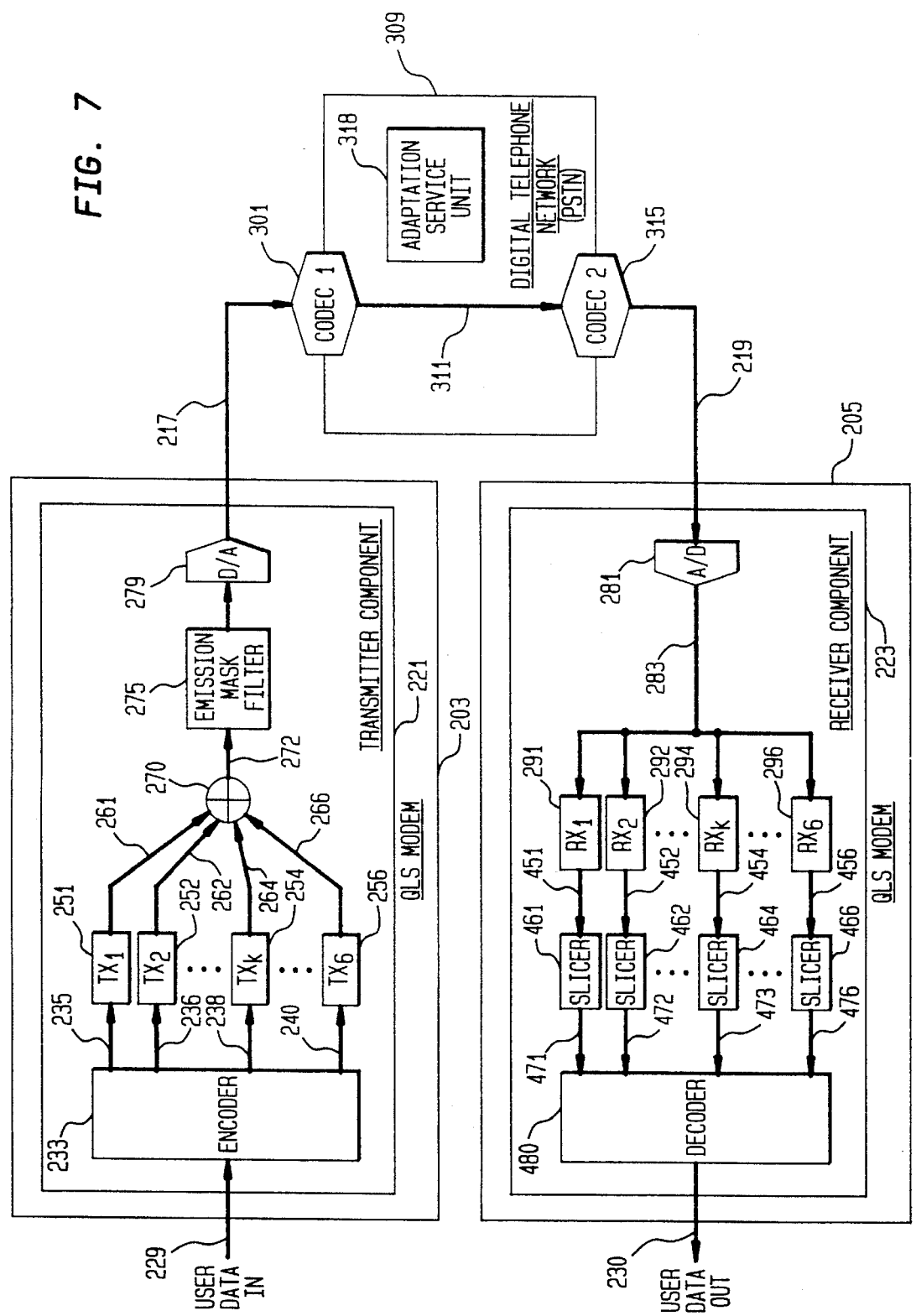

FIG. 7 illustrates a communications system arrangement with present inventive quantization-level sampling (QLS) modems 203 and 205, including a digital telephone network 309 and an adaptation service unit 318 within the telephone network. Modems 203 and 205 are representative of a plurality of QLS modems within the system which have at least one of a transmitter component and a receiver component, and preferably have both transmitter components and receiver components. However, for simplicity, operation of the system is described with reference to FIG. 7 only for the direction of transmission from modem 203 to modem 205, and so illustratively only the transmitter component 221 in modem 203 and only the receiver component 223 in modem 205 are shown. Also illustratively, the telephone network in FIG. 7 is the Public Switched Telephone Network (PSTN). The PSTN operates at a sampling rate of 8 ksamples/sec and employs μ-law CODECs which include bandlimiting filters that limit the loop response to the nominal frequency range of 300 Hz–3.3 kHz, and thus loops 217 and 219 can be considered to have available 6 kHz of two-sided bandwidth. Thus, in accordance with the above discussion, the parameters of the FIG. 7 system are 1/T=1 kHz, N=8, and M=6.

Operation of the system of FIG. 7 is first described in 'steady state' user-data mode, i.e. assuming that the settings for equalizers included in transmitter component 221 and receiver component 223 have been previously determined and that end-to-end user data transmission is in progress.

User data 229 is introduced to transmitting modem 203 at a rate of approximately 48 kbps. Encoder 233 encodes user data 229 into six parallel 1 ksymbol/second channel symbol streams 235–240, each symbol of which is equivalent to one of the 255 μ-law quantization levels, and thus representative of approximately eight user data bits. Transmitting component 221 includes six transmitter filters 251–256, each such filter (or transmitter equalizer) operating on one of said channel symbol streams. Transmitter filter outputs 261–266 are summed in transmitter summer 270, and the summer output signal 272 is bandlimited by emission mask filter 275. The output of emission mask filter 275 is converted to analog form by digital-to-analog converter 279 and the resultant analog signal is transmitted over subscriber loop 217 to the central office.

At the central office, CODEC1 301 samples the analog loop signal at a rate of 8 ksamples/second, and quantizes and encodes these sample voltages into DS0 digital sequence 311, which is transported through PSTN 309 to CODEC2 315. CODEC2 315 converts said DS0 sequence into a bandlimited analog signal which is transmitted on subscriber loop 219 to modem 205. The analog output signal from subscriber loop 219 is converted to digital form by analog-to-digital converter 281, which samples at a rate of 8 ksamples/second. The resultant digital signal 283 is operated on by six parallel receiver filters 291–296. The kth receiver filter (or receiver equalizer) 294 produces a stream of digital samples 454 a rate of 1 ksample/second, these samples being estimates of the transmitted channel symbol stream 238 input to the kth transmitter equalizer 254 at modem 203. Sample streams 451–456 are operated on by slicers 461–466 which map each sample to the 8-bit word corresponding to the nearest one of the 255 possible μ-law quantization levels (symbols). The six slicer output symbol streams 471–476 are operated on by decoder 460 which maps the six 1 ksymbol/second channel symbol streams into single user data output stream 230 at a rate of approximately 48 kbps.

FIG. 7 is now used to illustrate the adaptation procedures used to determine the settings of the equalizers included in transmitter component 221 and receiver component 223.

Adaptation of transmitter equalizers 251–256 is aided by adaptation service unit 318 located within digital telephone network 309. During the transmitter adaptation process, encoder 233 is placed into a training mode, in which it is caused to generate six 1 ksymbol/second streams of known pseudo-random symbols 235–240, instead of symbol streams based on encoded customer data. During this training phase, transmitter equalizers 251–256 are initially set to be unit impulses, with delays of one sample (i.e. 125 μs) between adjacent equalizers, e.g. $x_j(t)=\delta(t-jT_s)$, $j=1,2,\ldots,6$, where $T_s=125$ μs. Thus, during this initial portion of training, the settings of the encoder and transmitter equalizers result in transmission of a wideband pseudo-random training sequence such as described by Eq. (4) above. Adaptation service unit 318 observes six out of every eight samples of DS0 digital sequence 311 resulting from transmission of this training data. Based upon the differences between the observed sequence and the known pseudo-random transmitted training sequences, the adaptation service unit can determine appropriate coefficient settings for six transmitter equalizers, e.g. by using the well-known LMS algorithm. These coefficient settings are then communicated back to modem 203, where they are installed in transmitter equalizers 251–256. Encoder 233 is then taken out of training mode.

Training of the receiver equalizers 291–296 is also aided by adaptation service unit 318. During the receiver adaptation process, receiver equalizers 291–296 are initialized to a known state, typically a zero impulse response. Adaptation service unit 318 causes CODEC2 315 to encode a known pseudo-random training sequence, such as exemplified by Eq. (3). The resultant CODEC2 output signal drives subscriber loop 219, the output of which is digitized by analog-to-digital converter 281. The resultant digital signal 283 is operated-on in parallel by receiver equalizers 291–296, which are placed in adaptation mode, during which they determine appropriate coefficient settings based on the difference between their outputs and the known training sequence encoded by CODEC2, e.g. using the LMS algorithm. When this receiver adaptation phase is completed, the adaptation service unit takes CODEC2 out of initial training mode, so that it is driven by the DS0 digital sequence from the network.

Once both transmitter and receiver initial adaptation have been accomplished, end-to-end transmission of user data, or 'steady-state' operation, can begin.

Obviously, numerous modifications and variations of the present invention are possible in light of the above teachings. It is therefore understood that within the scope of the appended claims, the invention may be practiced otherwise than as specifically described herein.

What is claimed is:

1. A high speed quantization-level-sampling (QLS) modem for equalizing loop signals associated with a quantizing-rule-based telephone system network having a plurality of codecs using μ-law quantizing levels, which comprises:

a modem operatively connected to the quantizing-rule-based telephone system network and having at least one of a transmitter component and a receiver component for transmitting and for receiving signals respectively through the quantizing rule-based telephone system network which utilizes a transmission system wherein analog to digital (A/D) conversion of input data signals to first loop signals and digital to analog (D/A) conversion of received loop signals are based on a known quantizing rule with predetermined quantizing levels, the transmitting component including:

an encoder for encoding input data signals;

a plurality of transmitter equalizers for equalizing the encoded input data signals as equalized transmitter signals;

an adder for adding the equalized transmitter signals to a sum signal;

an emission mask filter for filtering the sum signal; and a D/A converter operatively connected to the quantizing-rule-based telephone system network for converting the sum signal using a channel symbol alphabet which is equivalent to predetermined quantizing levels of a quantizing-rule-based system network to generate the output loop signals equalized using the known quantizing rule with the predetermined μ-law quantizing levels, and for transmitting the output loop signal to a first codec; and the receiver component including:

an A/D converter operatively connected to the quantizing-rule-based telephone system network for converting the received loop signals from a second codec to an A/D converted signal equalized using the known quantizing rule with the predetermined μ-law quantizing levels and the channel symbol alphabet which is equivalent to the predetermined μ-law quantizing levels of the quantizing-rule-based system network;

a plurality of receiver equalizers for generating a received samples from the A/D converted signal;

a plurality of slicers for processing the received samples to generate output symbol streams; and a decoder for decoding the output symbol streams.

2. The modem of claim 1, wherein each of the plurality of transmitter equalizers includes a respective transmitter filter for filtering and transmitting separate signal symbols and wherein each of the plurality of receiver equalizers includes a respective receiver filter, for receiving and filtering separate signal symbols.

3. The modem of claim 2, wherein the plurality of transmitter equalizers includes six separate transmitter filters and the plurality of receiver equalizers includes six separate receiver filters.

4. The modem of claim 1, wherein the transmitting component uses the μ-law quantizing levels as the channel symbol alphabet.

5. The modem of claim 1, wherein the plurality of transmitter filters and receiver filters are adaptively determined so as to transmit and receive signals which pass at least substantially close to predetermined points equivalent to the predetermined μ-law quantizing levels at concise times, at least one of the concise times coinciding with sampling times of the quantizing-rule-based telephone system network.

6. The modem of claim 2, wherein each of the plurality of transmitter filters and receiver filters are adapted to operate at 1 kilosymbol/second.

7. A high speed quantization-level-sampling (QLS) modem communications system for equalizing loop signals which comprises:

(a) a quantizing-rule-based telephone system network which utilizes a transmission system wherein analog to digital (A/D) conversion of first loop signals and digital to analog (D/A) conversion of second loop signals are based on a known quantizing rule with the predetermined μ-law quantizing levels, and includes:

a plurality of coder/decoder (codec) stations for analog to digital and digital to analog conversion of the first and second loop signals, respectively, using μ-law quantizing levels; and a switched digital network operatively connected to the plurality of coder/decoder stations for transmitting the A/D and D/A converted signals among the plurality of coder/decoder stations; and, (b) a plurality of modems operatively connected to the quantizing-rule-based telephone system network, each such modem having a transmitter component and a receiver component for transmitting and receiving loop signals through the quantizing-rule-based telephone system network which utilizes the transmission system wherein A/D conversion of received loop signals and D/A conversion of input data signals to output loop signals are based on the known quantizing rule with the predetermined μ-law quantizing levels, the transmitter component including:

transmitting means within the transmitter component for D/A converting the input data signals to D/A output signals as the output loop signals using a channel symbol alphabet which is equivalent to the predetermined μ-law quantizing levels of a quantizing-rule-based system network, and for transmitting the output loop signals to the at least one codec, the transmitting means including:

an encoder for encoding input data signals;

a plurality of transmitter equalizers for equalizing the encoded input data signals as equalized transmitter signals;

an adder for adding the equalized transmitter signals to a sum signals;

an emission mask filter for filtering the sum signal; and a D/A converter operatively connected to the quantizing-rule-based telephone system network for converting the sum signal using the channel symbol alphabet which is equivalent to the predetermined μ-law quantizing levels of a quantizing-rule-based system network to generate the output loop signals equalized using the known quantizing rule with the predetermined μ-law quantizing levels, and for transmitting the output loop signals over a first channel to a first codec; and, receiving means within the receiver component for receiving the received loop signals from the at least one codec transmitted over a second channel, with the received loop signals having the channel symbol alphabet which is equivalent to the predetermined μ-law quantizing levels of a quantizing-rule-based system network, and for A/D converting the received loop signals; the receiving means including:

an A/D converter operatively connected to the quantizing-rule-based telephone system network for converting the received loop signals from a second codec to an A/D converted signal equalized using the known quantizing rule with the predetermined μ-law quantizing levels and the channel symbol alphabet which is equivalent to the predetermined μ-law quantizing levels of the quantizing-rule-based system network;

a plurality of receiver equalizers for generating a received samples from the A/D converted signal;

a plurality of slicers for processing the received samples to generate output symbol streams; and a decoder for decoding the output symbol streams.

8. The communications system of claim 7, which further includes timing means for each modem to synchronize the modem with the timing of the telephone system network.

9. The communications system of claim 7, wherein the quantizing-rule-based telephone system network includes at least one adaptation service unit having central circuitry and an equalization filter, the adaptation service unit being adapted to receive a training initiation signal from any of the plurality of modems, to identify any interference related to the initiation signal, and to feed back to an initiating modem adaptation signals to adjust and equalize at least one of the transmitting means and the receiving means to minimize interference.

10. The communications system of claim 7, wherein the telephone system network operates at 64 kilobits per second and has 48 kilobits per second available for modem transmission data.

11. The communications system of claim 7, wherein the transmission system is a μ-law transmission system.

12. The communications system of claim 11, wherein each of the modems includes six transmitter filters and six receiver filters.

13. The communications system of claim 10, wherein the transmission system is a μ-law transmission system.

14. The communications system of claim 13, wherein each of the modems includes six transmitter filters and six receiver filters.

* * * * *